United States Patent [19]

Chambers

[11] 4,350,746
[45] Sep. 21, 1982

[54] AUXILIARY POWER SOURCE FOR STARTING A MOTOR VEHICLE

[76] Inventor: Kenneth R. Chambers, Rte. 9, Box 301-A, Greensboro, N.C. 27409

[21] Appl. No.: 188,222

[22] Filed: Sep. 17, 1980

Related U.S. Application Data

[63] Continuation-in-part of Ser. No. 32,789, Apr. 23, 1979, abandoned.

[51] Int. Cl.³ .............................................. H01M 2/26
[52] U.S. Cl. .................................. 429/121; 429/178
[58] Field of Search .......................... 429/121, 178, 49

[56] References Cited

U.S. PATENT DOCUMENTS

| | | | |
|---|---|---|---|
| 2,551,990 | 5/1951 | Wills | 429/121 X |
| 2,701,332 | 2/1955 | Andre | 429/178 X |
| 3,689,322 | 9/1972 | Lindenberg et al. | 429/178 X |
| 3,776,778 | 12/1973 | Azuma et al. | 429/178 X |
| 3,956,576 | 5/1976 | Jensen et al. | 429/121 X |
| 3,981,744 | 9/1976 | Greatback et al. | 429/178 |
| 4,084,037 | 4/1978 | Morton | 429/121 X |

Primary Examiner—Charles F. LeFevour
Attorney, Agent, or Firm—Charles R. Rhodes; Judith G. Smith

[57] ABSTRACT

A DC voltage source is housed in a reusable casing having bottom and side walls. A pair of coplanar terminal plates are slidably attached in a track along the bottom wall of the casing as to be horizontally movable to adjust the distance between the plates to correlate to the spacing between the terminal posts on the top surface of a conventional automotive battery. In use the auxiliary power source is self-contained, portable, and placed on top of a dead vehicle battery such that the charged terminal plates on the casing are in contact with the corresponding terminal posts of the dead battery and the vehicle is started.

4 Claims, 3 Drawing Figures

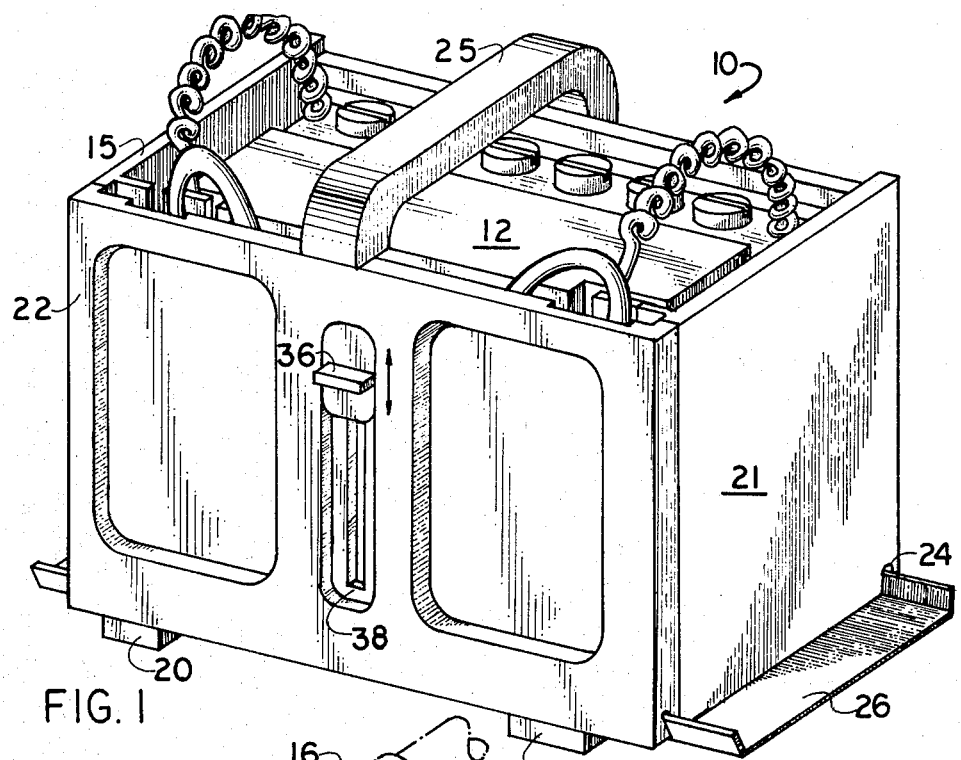
FIG. 1
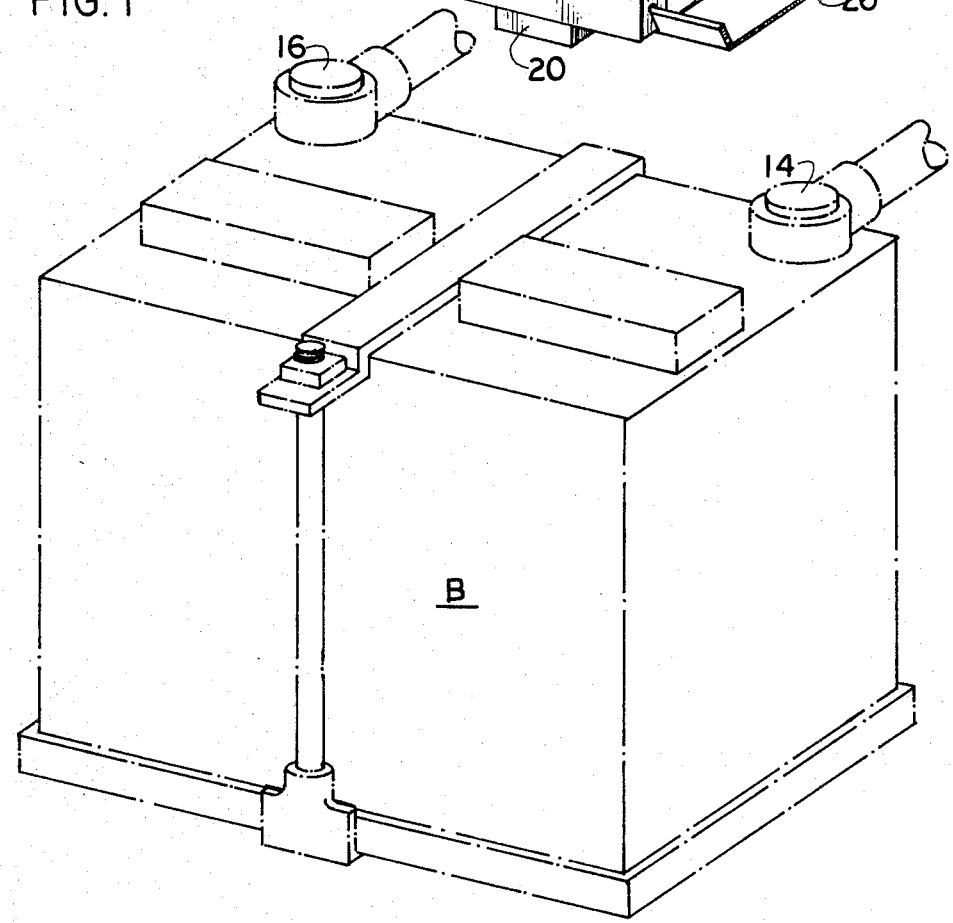

AUXILIARY POWER SOURCE FOR STARTING A MOTOR VEHICLE

REFERENCE TO OTHER APPLICATION

The present application is a continuation-in-part of applicant's co-pending application Ser. No. 32,789, filed Apr. 23, 1979 now abandoned.

BACKGROUND OF THE INVENTION

Motorists occasionally find that due to a defective or dead battery there is insufficient electrical energy available for starting their vehicle. Although such a situation is never desirable, it quite often occurs at most inopportune times, as for example when there are no other automobiles available with which to use jumper cables, or no service facility nearby for aid in starting the vehicle.

There are, of course, various devices available for use in circumstances where other automobiles or a service facility are available. One such device includes an electrical cable (jumper cable) for connecting the operative battery of one vehicle to the defective battery of a second vehicle. Another approach, when service facilities are available, is to have the service facility bring a portable battery rig with cables to the site and use it to start the vehicle.

However, these approaches and others known to the applicant are dependent upon the availability of a second vehicle and jumper cables or a service facility nearby. Obviously the problems can and do occur when neither is available. The present invention therefore is directed to a portable auxiliary power source which is completely self-contained and conveniently kept on hand to be used to start an automobile having a defective battery when away from the presence of a second vehicle or a service facility.

SUMMARY OF THE PRESENT INVENTION

The auxiliary power source according to the present invention is a self-contained, portable voltage cell. The overall construction includes a voltage cell contained in a generally rectangular housing preferably of a size smaller than a conventional automotive battery. The terminals of the voltage cell are electrically connected to exposed, preferably slidably mounted, positive and negative terminal plates on the bottom wall thereof. The terminal plates are located in a track underneath the bottom wall of the housing coplanar and horizontally adjustable with relationship to each other, so as to engage the respective terminal posts of a variety of sizes of automotive batteries. The terminal plates preferably have non-slip or roughened surfaces to ensure adequate contact between the plates and the posts. When the auxiliary cell is in place on the defective battery, and the car ignition is activated, electrical energy is thereby transmitted from the auxiliary battery to the electrical system and becomes the power source sufficient to start the vehicle. Although it is obvious that a 12-volt battery constructed according to the present invention could be used, the inventor has found that a smaller 8-volt unit is sufficient for starting a motor vehicle.

The above discussion has been directed to use in automobiles but the invention is equally useful in boats and other vehicles. Sometimes the defective battery is of the type having side mounted terminal posts. Therefore in a preferred embodiment, a pair of shortened jumper cables are provided in the housing for connecting the auxiliary power source to the defective battery.

The auxiliary power source has been scaled down in size and weight and the casing designed for convenient storage in the trunk or other vehicle storage area. A handle on the top makes it easily lifted and carried to the defective battery. The outer surface of the reusable casing includes instructional indicia and color keys to identify positive and negative terminals for those persons inexperienced in the use of such devices. When the voltage cell in the portable unit becomes defective, it is simply removed from the case and replaced with a new cell.

The objectives achieved by the present invention therefore include:
1. The provision of a portable auxiliary power source for starting a motor vehicle having a defective battery;
2. The provision of an auxiliary power source which may be utilized for starting a motor vehicle having a defective battery when said vehicle is inaccessible to a service facility or a second vehicle having a working battery and jumper cables;
3. The provision of such an auxiliary power source as described above which may remain conveniently stored in the vehicle; and
4. An auxiliary power source of simple design which may be safely utilized by persons generally inexperienced in such devices.

Other objects and advantages of the present invention will become apparent to those skilled in the art when the following detailed description is studied in conjunction with the accompanying drawings of which:

FIG. 1 is a perspective view of the auxiliary power source of the present invention as it would be positioned in use on a defective battery;

DETAILED DESCRIPTION OF A PREFERRED EMBODIMENT

FIG. 1 illustrates the auxiliary power source 10 as it would be placed on a defective automotive battery B (the surrounding vehicle engine is not shown). The automotive battery B conventionally is a 12-volt, wet cell, including removable vent covers 12 and positive and negative terminal posts or poles 14 and 16. On occasion, most often in sports cars, the battery terminal posts will be positioned on the side walls of the battery casing. However, they generally are positioned as shown on the top of battery B. Cables 18 lead from the terminal posts 14,16 to the engine ignition system.

Figure 3:
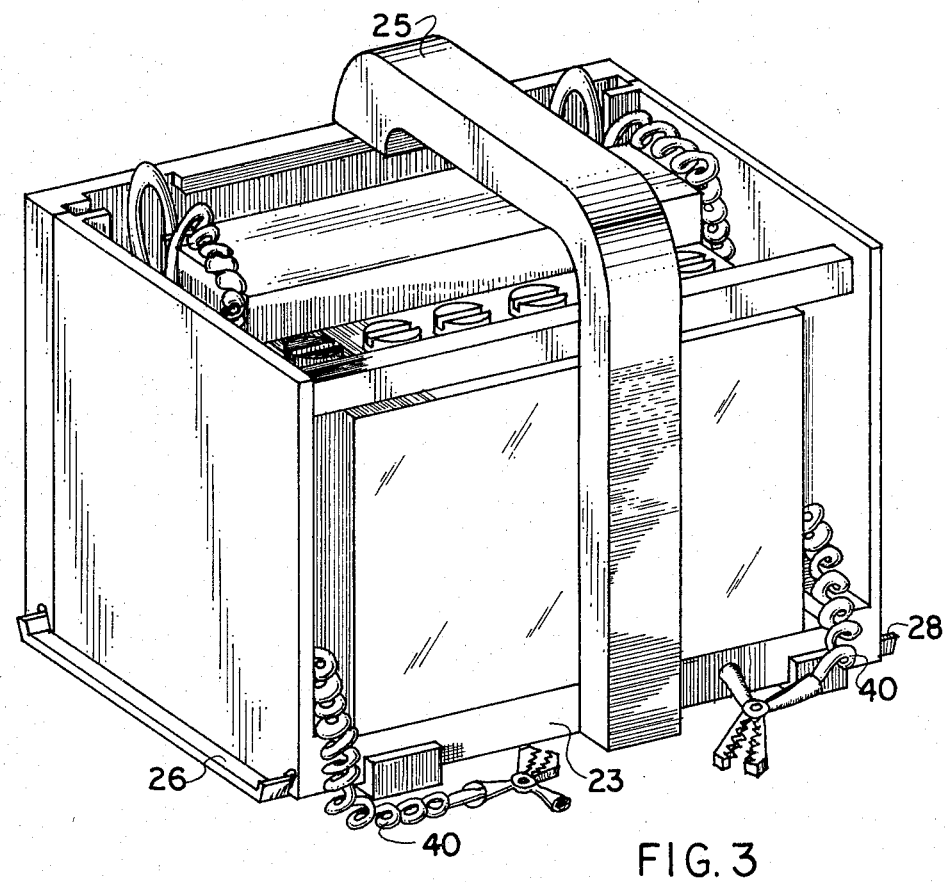
FIG. 3 is a rear perspective of the invention shown in FIG. 1.

The auxiliary power source 10 preferably includes an 8-volt wet cell 12 (although a 12-volt cell is acceptable) developed for use as described above in starting motor vehicles which have defective batteries. Conventionally the energy cell 12 includes top, bottom and side walls and is housed in a reusable case 15 which has legs 20, side walls 21, a removable front wall 22, a bottom wall 23, and handle 25. The handle 25 includes an elongated portion 25' which extends downwardly and is removably attached to the bottom wall 23 (FIG. 3). Positively and negatively charged metal terminal plates 26,28 are slidably positioned in a track 24 parallel to the bottom wall, and are connected internally of housing 20 to the cell 15 in a manner described below. The plates 26 and 28 are horizontally adjustable (in the direction of the arrows) to allow for differences in the spacing between the terminal posts 14,16 of various brands of batteries.

Figure 2:
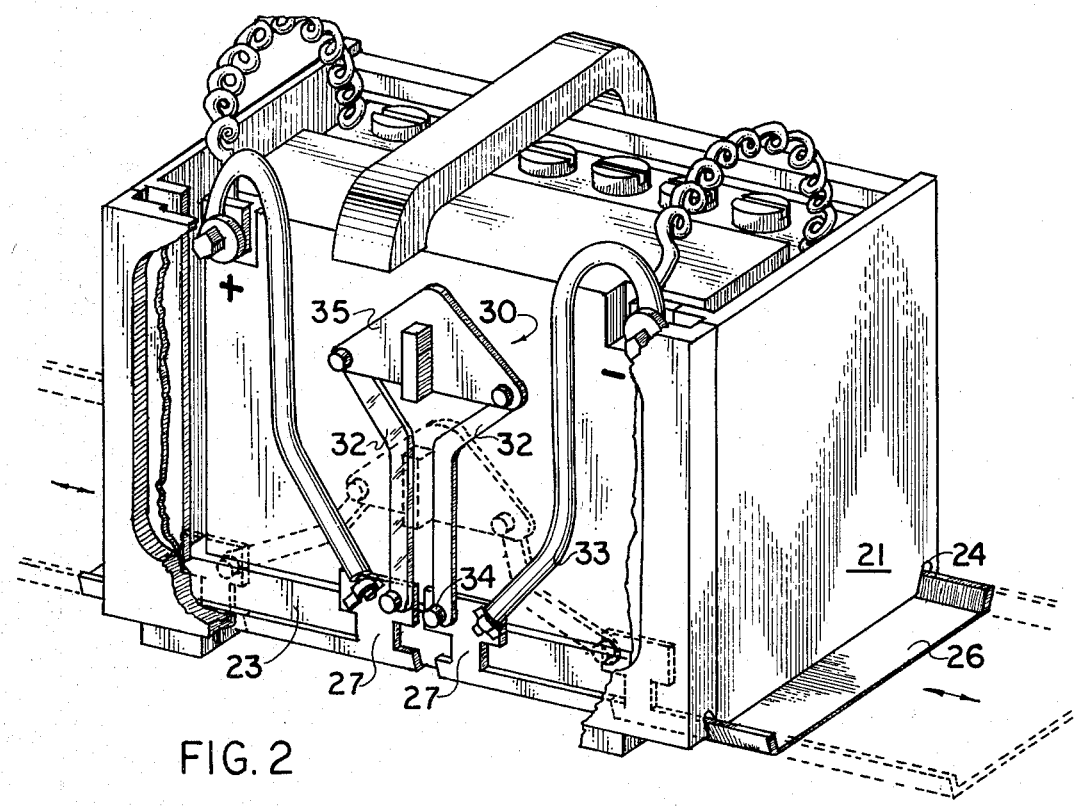
FIG. 2 is a perspective view with the casing removed illustrating the means for horizontally adjusting the terminal plates.

The plates 26,28 are illustrated in FIG. 1 in their first, substantially retracted position which would correspond in width to most conventional automotive batteries. Additionally that retracted state would generally serve as the storage or "normal" plate position. FIG. 2 illustrates the plates 26,28 in a second, substantially protracted position which would fit over the terminal posts of wider, less conventionally sized batteries.

FIG. 2 also illustrates the terminal plate control means 30 for horizontally adjusting the terminal plates 26 and 28. The front wall 22 has been partially cut away to reveal the pivot arms 32 to which the plates are mounted and which move back and forth in track 24 in the bottom of the housing 15. The track 24 includes a pair of opposing flanges 29 overlapping the exterior surface of the bottom wall 23 parallel to the front and rear walls of the housing. One flange 29 depends beneath the bottom wall 23 and the second flange 29 depends from the lower edge of the removable front wall, both a depth away from the wall sufficient to seal the plates 26,28 slidably therein as shown in FIG. 2. The terminal plates 26,28 each include a metal shoulder 27 depending upwardly at right angles therefrom for purposes of connecting the plates to the respective terminals 14,16, and the pivot arms 32. One end of arm 32 is pivotally connected to the shoulder 27 by a pivot pin 34, and at the opposite end to one side of a yoke 35. The yoke 35 has one of the arms 32 pivotally connected on each side, and is connected along the center portion thereof to a control handle or knob 36. The yoke and the arms may be pivotally connected by means of pivot pins or other conventional means. As illustrated here, the pivot pins are on the inner surface of the yoke.

The yoke 35 is positioned interiorly of the housing 20, and the control handle 36 on the exterior, movable in a vertical slot 38. The slot 38 extends vertically in the approximate center of the housing front wall 23. Thus when it is desired to extend the distance between the plates 26 and 28, the knob 36 is pushed downwardly in slot 38, the connecting bars pivot downwardly and outwardly, pushing the plates apart. The terminal plate shoulders 27 are movable in the space existing between the terminal edge of the bottom wall and the interior surface of the front wall. Alternatively, to move the plates inwardly and closer together, the knob 36 is moved upwardly in the slot 38, pulling the connecting bars 35 upward and the terminal plates inward. The plates 26 and 28 are connected to the respective terminal posts 14,16 by means of copper or other electrically conducting wires 33. One end of the wire is operatively connected to the terminal post 14 or 16 by conventional means, and the opposite end to the leg 27 on the appropriate terminal plate 26 or 28.

It should be mentioned here that the yoke 35, the control handle 36, and at least one of the connecting arms 32 are to be made from a non-conducting material such as one of the heavier weight, durable plastics. This is to ensure that no electricity is conducted between the two oppositely charged plates.

The housing or case 15 is preferably formed from a durable, rigid plastic of a type resistant to damage from battery acids, dirt and oils. The case 15 and the terminal plates 26,28 and control means therefore are integrally related and reusable, with the voltage cell 12 being susceptible to periodic replacement. As the voltage cell 12 loses efficiency, it is removed from the case and discarded, and a new cell is substituted.

A relatively short jumper cable 40 is provided to extend from each terminal post 14,16 for use with vehicle batteries having side mounted terminal posts. The cables 40 are provided with the case 20 and are stored in compartments 42 when not in use. It is preferred that the jumpers 40 include a coiled or otherwise retractable cable for storage convenience.

Thus it can be seen that when cell 12 must be replaced it is a relatively simple operation to disengage the terminal posts 14,16 from the wires 33 and jumper cables 40 and remove the cell from the housing 15. A new cell 12 is then placed in the housing 15 and connected to the wires 33 and cables 40. The side, front, rear and bottom wall all support the cell 12 therein making it a portable, totally self-contained unit.

As explained hereinabove, the auxiliary power source 10 is maintained in the automobile, the truck or boat or other motor vehicle until needed. When vehicle battery B fails, the auxiliary cell 10 is removed from its storage area and placed on top of the vehicle battery B. The terminal plates 26,28 are slidably adjusted to a point where they are aligned with and positioned on the respectively charged terminal posts, i.e. plate 26 on post 16 and plate 28 on post 14. The plates 26,28 have a non-slip surface on the underside thereof to ensure positive electrical contact with the surface of the posts. For the additional convenience of those persons not experienced in automotives it is anticipated that written indicia, in addition to color keys, identifying positive and negative plates and posts will be provided on the reusable case 20 to minimize danger of shock, sparks, or damage to the ignition system by incorrect positioning of the terminal plates on the posts.

Further, it is anticipated that a plastic cover plate can be provided for use over the negatively charged terminal plate, and jumper cables 40 may be made at least twenty-three inches long, to comply with OSHA or other agency regulations requiring means for grounding the battery before engaging both terminals.

Legs 20 are provided for clearance where necessary of the vent covers, handles, etc. which may be present on the defective battery.

When the auxiliary cell 10 is properly positioned, the vehicle ignition system is activated by the operator and energy is transmitted from the auxiliary cell to the ignition system to start the vehicle. When the vehicle is running the auxiliary cell is removed and returned to storage. If necessary the vehicle may then be taken to a service facility for recharging of the defective battery.

While a preferred embodiment of the present invention has been described and shown herein, it is recognized that other and further modifications may be made without departing from the scope of the invention as claimed below.

What is claimed is:

1. An auxiliary power source for use in starting a motor vehicle having a defective battery of the type having a housing and positively and negatively charged terminal posts spaced a distance apart on the top surface thereof, said auxiliary power source comprising:
  (a) a housing having bottom and side walls and a removable front wall and including a battery therein;
  (b) a pair of flat, electrically conductive terminal plates depending from said housing underneath said bottom wall in a plane substantially parallel thereto, said terminal plates being spaced apart horizontally;

(c) means for selectively adjusting the spacing between said plates to substantially correlate to the distance between said vehicle battery terminal posts;

(d) said terminal plates being connected to said battery so that one of said plates is negatively charged and the other is positively charged;

(e) whereby said auxiliary power source may be positioned on top of said defective battery with said positively and negatively charged terminal plates contacting the respective ones of said positively or negatively charged terminal posts, and when the vehicle ignition system is activated voltage is transmitted from said auxiliary power source sufficient to start the vehicle.

2. An auxiliary power source according to claim 1 wherein said means for adjusting the distance between said terminal plates includes:

(a) a control handle;

(b) a connecting arm pivotally attached at a first end to said terminal plate, and being pivotally attached at an opposing second end to said control handle;

(c) a track comprising opposing, spaced apart flanges, one of said flanges depending downwardly from beneath said bottom wall, parallel to said rear wall, and a second flange depending downwardly from the lower edge of said front wall, such that said flanges underlap said terminal plates, slidably retaining said terminal plates therein;

whereby movement of said handle upwardly or downwardly translates motion to said connecting means to move said terminal plates in either direction within said track.

3. An auxiliary power source according to claim 2 wherein said means for adjusting the distance between said terminal plates further includes:

(a) a slot extending vertically through the approximate center of said removable front wall, with said control handle positioned exteriorly of said front wall and movable upwardly and downwardly within said slot;

(b) a yoke positioned interiorly of said front wall and including means for removably attaching to said control handle, with said attachment means extending through said slot;

(c) each of said terminal plates including a shoulder extending upwardly at right angles therefrom movable in the space between said bottom wall and said removable front wall, the first end of each of said connecting arms being pivotally attached to a respective one of said shoulders;

(d) the second end of each of said connecting arms being attached to said yoke.

4. An auxiliary power source as described in claim 1 wherein said terminal plates include a non-slip contact surface thereon.

* * * * *